United States Patent [19]

Mausner

[11] Patent Number: 4,922,177
[45] Date of Patent: May 1, 1990

[54] DEVICE FOR THE ELECTRICAL TRANSMISSION OF A MECHANICAL VARIABLE

[75] Inventor: Eberhard Mausner, Bad Soden, Fed. Rep. of Germany

[73] Assignee: VDO Adolf Schindling AG, Frankfurt am Main, Fed. Rep. of Germany

[21] Appl. No.: 257,989

[22] Filed: Oct. 13, 1988

[30] Foreign Application Priority Data

Nov. 23, 1987 [DE] Fed. Rep. of Germany ....... 3739613

[51] Int. Cl.$^5$ .............................................. G05B 1/06
[52] U.S. Cl. ..................................... 318/663; 318/139; 388/810; 123/399
[58] Field of Search ................ 318/663, 599, 603, 139; 388/800–810; 338/47, 67, 108, 113, 153, 172, 176, 184, 198, 95, 96; 74/512, 513, 514, 481, 482, 516; 123/399, 400, 361, 403, 363, 369, 370

[56] References Cited

U.S. PATENT DOCUMENTS

| | | | |
|---|---|---|---|
| 708,962 | 9/1902 | Henry | 318/139 X |
| 2,832,018 | 4/1958 | Laub | 318/663 X |
| 3,349,309 | 10/1967 | Dannettell | 318/139 X |
| 3,736,482 | 5/1973 | Brusaglino | 388/807 |
| 3,789,283 | 1/1974 | Kabat | 318/663 X |
| 3,845,368 | 10/1974 | Elco | 318/139 |
| 4,082,988 | 4/1978 | Reime et al. | 318/139 |
| 4,112,343 | 9/1978 | Douglas | 318/663 X |
| 4,114,076 | 9/1978 | Teranishi et al. | 318/139 X |
| 4,437,048 | 3/1984 | Arnold | 318/663 X |
| 4,492,908 | 1/1985 | Stockle et al. | 318/663 |
| 4,549,125 | 10/1985 | Sonobe | 318/663 |
| 4,644,236 | 2/1987 | Junginger et al. | 388/810 |
| 4,716,518 | 12/1987 | Hawkins et al. | 338/191 X |
| 4,765,296 | 8/1988 | Ishikawa et al. | 123/399 |
| 4,785,224 | 11/1988 | Pfalzgraf et al. | 318/663 |

Primary Examiner—William M. Shoop, Jr.
Assistant Examiner—Paul Ip
Attorney, Agent, or Firm—Martin A. Farber

[57] ABSTRACT

A device is described for the electrical transmission of a mechanical variable, particularly an electric gas pedal for automotive vehicles. The device comprises a first potentiometer system as desired-value transmitter and a second potentiometer system as actual-value transmitter. At least one of the potentiometer systems has, in addition to the first wiper, a second wiper the wiper contact of which is at a predetermined fixed distance from the wiper contact of the first wiper and lies at a separate electric potential with respect to it.

7 Claims, 3 Drawing Sheets

DEVICE FOR THE ELECTRICAL TRANSMISSION OF A MECHANICAL VARIABLE

FIELD AND BACKGROUND OF THE INVENTION

The present invention refers to a device for the electrical transmission of a mechanical variable, particularly an electric gas pedal for automotive vehicles, having a first potentiometer system as desired-value transmitter from which an electric desired-value signal can be fed to an electric control unit, and having a controlling element which can be controlled by electric signals from the controller unit, and the adjustment range of which is smaller than the adjustment range of a second potentiometer system as actual-value transmitter which is connected therewith.

Devices are already known by which the instantaneous position of the accelerator pedal is transmitted electrically to the throttle valve of the carburetor of an automotive vehicle, or the control rod of the injection pump. For this purpose, an electric position transmitter in the form of a variable resistor (potentiometer) is coupled mechanically as desired-value transmitter to the accelerator pedal. In similar manner, the position of the throttle valve or the control rod of the injection pump is indicated by a second variable resistor (actual-value transmitter). Throttle valve or control rod as fuel-measuring elements are in this case driven by an electromagnetic device and controlled by a control circuit primarily for correspondence between desired value and actual value. The electrical transmission of the position of the accelerator pedal, in addition to the simplicity of the laying of the wires thereof, has the advantage over rods or Bowden cables that the torque and power of the internal combustion engine driving the automotive vehicle can be varied electronically in various ways from a standpoint of safety. The potentiometers of the prior art which are used as desired-value and actual-value transmitters must, in general, be adjusted at the factory. Changes in the characteristic curve due to increased contact or leakage resistances as a result of dirt, moisture or corrosion must be monitored so that uncontrollable propulsion values of the automobile do not lead to dangerous driving conditions.

SUMMARY OF THE INVENTION

It is an object of the invention so to develop a device for the electric transfer of a mechanical variable of the aforementioned type that the potentiometers used as desired-value and/or actual-value transmitter are self adjusting by means of a microprocessor, and that their characteristic curve is constantly monitored.

According to the invention, at least one of the two potentiometer systems has, in addition to the first wiper which passes over a part of the length of the resistance path, a second wiper the wiper contact of which is at a predetermined fixed distance from the wiper contact of the first wiper and lies at an electric potential which is different from the electric potential of the wiper contact of the first wiper.

A feedback potentiometer having a voltage-tapping wiper which is displaceable over a resistance path is already known in which the supplying of the voltage to the resistance path takes place over two voltage-feed wipers which are also displaceable over the resistance path. Upon the movement of the voltage-tapping wiper, which is coupled with a mechanical device, the voltage-feed wipers are pushed into the corresponding end positions which result from the total path of the voltage-tapping wiper. Accordingly, the known feedback potentiometer, to be sure, is self-adjusting, but the characteristic curve changes due to the varying length of the resistance path used between the two voltage-feed wipers. A continuous monitoring of the characteristic curve after it has once been set, is also not provided.

According to a feature of the invention, the second wiper, near one of its end positions, passes over the remaining length of the resistance path which has not been passed over by the first wiper.

Still further according to the invention, the difference in potential between the wiper contacts of the two wipers is measured and used to correct the course of the resistance of the potentiometer system.

Another feature is that, in a predetermined wiper position, the difference in potential from an established desired value is determined and corrected in the direction towards a deviation of zero.

Still further, fixed contacts for the determination of the potential difference are arranged at two fixed points on the resistance path which are spaced from each other in the direction of movement of the wipers With the above and other objects and advantages in view the present invention will become more clearly understood in connection with a detailed description of preferred embodiments, when considered with the accompanying drawings, of which:

DETAILED DESCRIPTION OF THE PREFERRED EMBODIMENT

Figure 1:
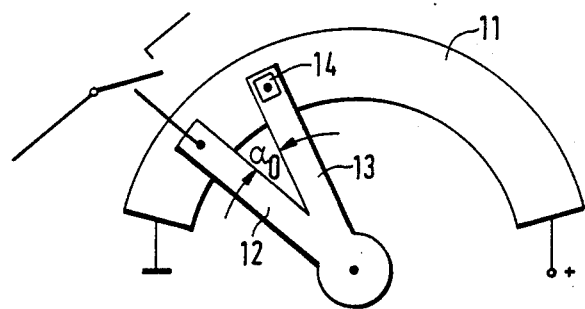
FIG. 1 is a diagrammatic view of one embodiment of the potentiometer of the invention.

In FIG. 1 the sector-shaped resistance path 11 is connected in known manner at its ends to the two poles of a source of voltage and is passed over by a voltage-tapping wiper 12 which is mounted concentrically to the centerpoint of the curved resistance path. At a fixed angle to the voltage-tapping wiper 12, a measurement wiper 13, whose wiper contact 14 is insulated, moves synchronously with it. The distance in radian measure between the wiper contact of the voltage-tapping wiper 12 and the insulated wiper contact 14 of the measurement wiper 13 is always the same, so that upon the application of a given voltage to the resistance path 11, a given partial voltage can theoretically always be tapped off between the wiper contacts of the wipers 12 and 13. This applies, however, only ideal conditions, as will be shown below.

Figure 2:
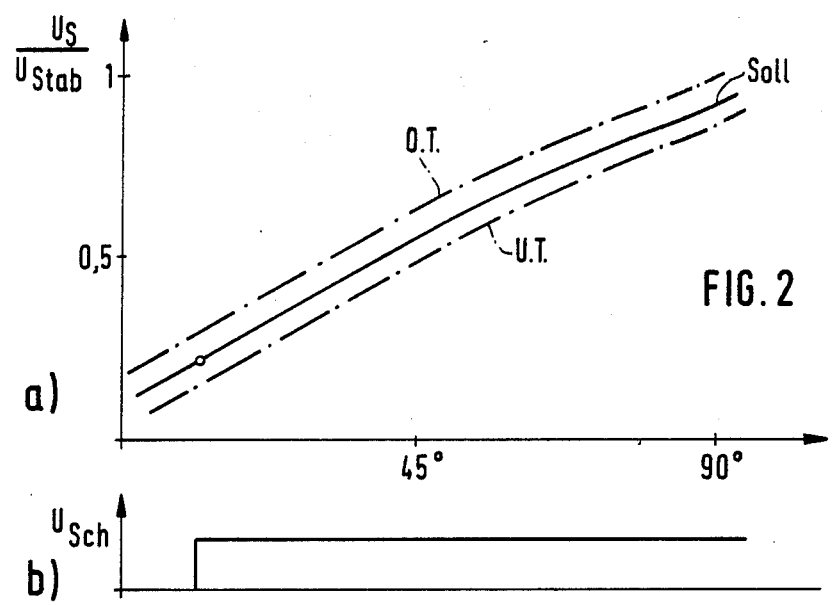
FIG. 2 shows in a graph the variation of the desired characteristic curve over the wiper path.

In FIG. 2, the course of the voltages over the wiper path is shown. FIG. 2a shows the course of the potentiometer characteristic curve between the two end positions of the voltage-tapping wiper 12. As can be seen, the characteristic curve lies over its entire course between the dot-dash lines OT and UT which represent the tolerance limits.

In FIG. 2b, the partial voltage which can be tapped off along the path of the wipers 12 and 13 over the resistance path between the two wiper contacts of the wipers 12, 13 is shown over the same path. In the assumed case, this partial voltage is constant over the entire length of the resistance path, which indicates that the potentiometer is intact.

Figure 3:
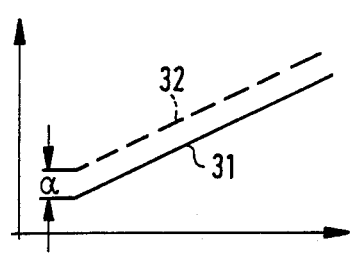
FIG. 3 shows an example of an offset.

In FIG. 3, a parallel deviation of the potentiometer characteristic curve 31 from the desired characteristic curve 32 is shown. Such an offset can have its cause, for instance, in high contact resistance of the resistance-path/voltage-tap-wiper combination or of a plug connection, as a result of aging, corrosion or dirt.

Figure 4:
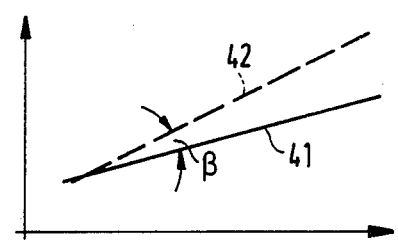
FIG. 4 shows an angular deviation of the characteristic curve from the ideal desired characteristic curve.

FIG. 4 shows a corresponding angular deviation of the characteristic curve 41 from the desired characteristic curve 42. Such an angular deviation results, for instance, from leakage resistance at a voltage connection for the resistance path 11, resulting in a correspondingly lower supply of voltage to the resistance path.

Figure 5:
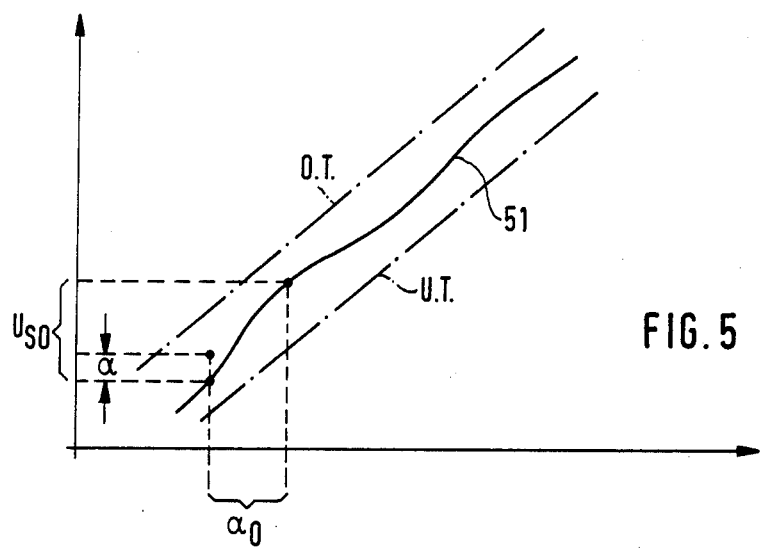
FIG. 5 shows the determination of the position and slope of the characteristic curves.

Finally, FIG. 5 shows varying slope and varying distances from the tolerance limits OT and UT of the course of the potentiometer characteristic curve 51. As a result of the varying slope there is obtained between the two wiper contacts of the wipers 12 and 13 of the potentiometer of FIG. 1, a varying measurement voltage $U_{so}$, which can serve for the correction of the potentiometer characteristic curve 51.

Figure 6:
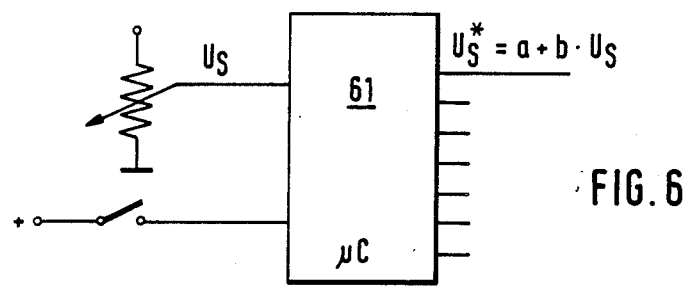
FIG. 6 shows also in a diagrammatic view, the development of the adjustment and correction device with microprocessor.

For this purpose, both the partial voltage tapped off by the voltage-tap wiper 12 and the measurement voltage present between the two wiper contacts of the wipers 12, 13 is given to the input of a microcomputer 61 (FIG. 6) within the memory of which the correction values for offset and angular deviation in accordance with FIGS. 3 and 4 are stored, so that the product of the tapped voltage by the correction factors can be tapped off as corrected voltage value at the outputs of the microcomputer 61.

Figure 7:
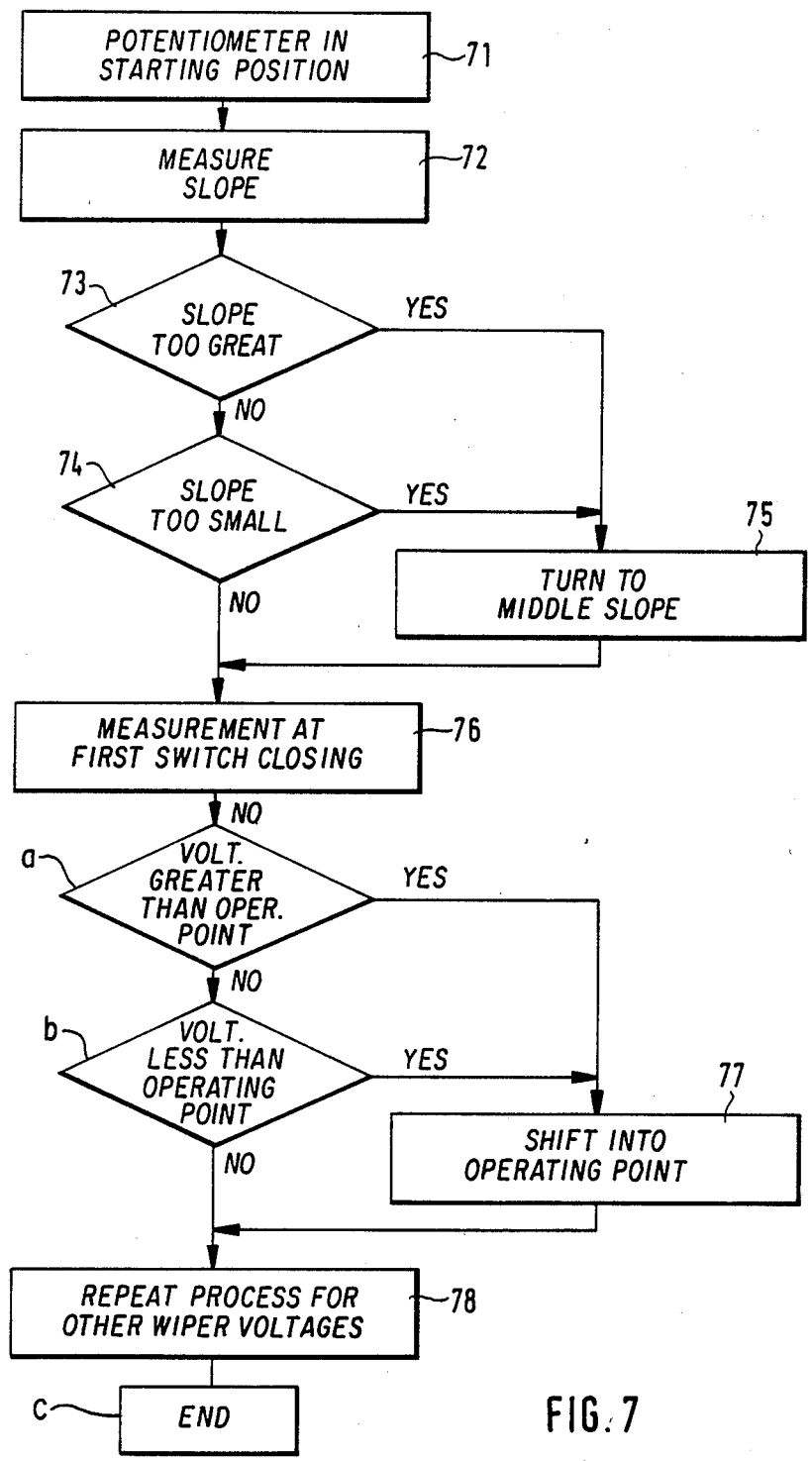
FIG. 7 shows in the form of a flowchart the program of the microprocessor control.

In the flowchart of FIG. 7, the calibration process, starting with the potentiometer wiper 12 in the starting position (position 71), is carried out in the manner that the process is repeated each time in succession for different wiper voltages U1, U2, U3. For this purpose, with position 72, the slope is measured and in case of deviations in the one direction (position 73) or the opposite direction (position 74) the slope-angle correction factor which turns the characteristic curve back into the middle slope is calculated (position 75). Thereupon, the accordance with position 76, the deviation of the characteristic curve actual value from the desired value is measured and, at position 77, the operating point is shifted correspondingly in accordance with the result of the measurement. As next step (position 78), the repetition of the measuring process is commenced with other wiper voltages U1, U2, U3, etc., and the measurement program is then terminated after the determination of all correction values.

Figure 8:
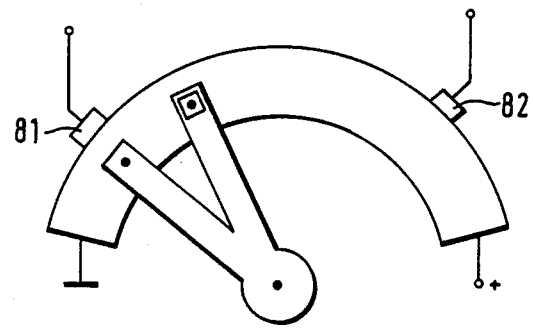
FIG. 8 is a view of a second embodiment of the potentiometer of the invention.

In accordance with another embodiment, shown in FIG. 8, connections 81, 82 can be provided at defined points of the resistance path for the monitoring of the potentiometer path. [Flow chart of FIG. 7]
71 Potentiometer in starting position
72 Measurement of the slope
73 Slope too great?
74 Slope to small?
75 Turn to middle slope
76 Measure operating point on switch contact upon first closing
   (a) Potentiometer voltage greater than operating point?
   (b) Potentiometer voltage less than operating point?
77 Shift into operating point
78 Repeat process with wiper voltage U1, U2, U3, etc., then
   (c) End

I claim:

1. A device for the electrical transmission of a mechanical variable, particularly an electric gas pedal for automotive vehicles, the device comprising
   a control unit;
   a first potentiometer system serving as desired-value transmitter from which an electric desired-value signal is fed to the electric control unit;
   a second potentiometer system;
   a controlling element which is controlled by electric signals from the control unit, the second potentiometer system being operative over an adjustment range of the controlling element, the second potentiometer system serving as actual-value transmitter connected to the control unit; and wherein
   each potentiometer system has a first wiper which passes over a part of the length of a resistance path;
   at least one of the two potentiometer systems has, in addition to the first wiper which passes over a part of the length of the resistance path, a second wiper with a wiper contact set at a predetermined fixed distance from a wiper contact of the first wiper; and
   the second wiper contact lies at an electric potential which is different from an electric potential of the wiper contact of the first wiper.

2. The device according to claim 1, wherein
   the second wiper, near one of its end positions, passes over a remaining length of the resistance path which has not been passed over by the first wiper.

3. The device according to claim 1, further comprising
   means for measuring a difference in potential between the wiper contacts of the two wipers; and potential between the wiper contacts of the two wipers; and
   means responsive to a measurement of potential difference by the measurement means for correcting a course of the resistance of the potentiometer system having the two wipers.

4. The device according to claim 2, further comprising
   means for measuring difference in potential between the wiper contacts of the two wipers; and
   means responsive to a measurement of potential difference by the measurement means for correcting a course of the resistance of the potentiometer system having the two wipers.

5. The device according to claim 3, wherein
   in a predetermined wiper position, the difference in potential from an established desired value is determined and corrected in the direction towards a deviation of zero.

6. The device according to claim 1, further comprising
   fixed contacts for the determination of potential difference arranged at two fixed points on the resistance path which are spaced from each other in the direction of movement of the wipers.

7. A device for the electrical transmission of a mechanical variable, particularly an electric gas pedal for automotive vehicles, the device comprising
- a control unit;
- a first potentiometer system serving as desired-value transmitter from which an electric desired-value signal is fed to the electric control unit;
- a second potentiometer system;
- a controlling element which is controlled by electric signals from the control unit, the second potentiometer system being operative over an adjustment range of the controlling element, the second potentiometer system serving as actual-value transmitter connected to the control unit; and wherein
- each potentiometer system has a first wiper which passes over a part of the length of a resistance path;
- at least one of the two potentiometer systems has, in addition to the first wiper which passes over a part of the length of the resistance path, a second wiper with a wiper contact set at a predetermined fixed distance from a wiper contact of the first wiper; and
- the second wiper contact lies at an electric potential which is offset from an electric potential of the wiper contact of the first wiper.

* * * * *